United States Patent Office 3,508,864
Patented Apr. 28, 1970

3,508,864
HYDROXYLAMMONIUM PERCHLORATE MANUFACTURE
Wallace W. Thompson, Tarzana, and David R. V. Golding, Malibu, Calif., assignors to North American Rockwell Corporation, a corporation of Delaware
No Drawing. Filed Oct. 21, 1966, Ser. No. 588,323
Int. Cl. C01b *11/18*
U.S. Cl. 23—85                                                       1 Claim

ABSTRACT OF THE DISCLOSURE

This invention relates to the manufacture of hydroxylammonium perchlorate using ion exchange resins to separate interfering ions from starting hydroxylammonium and perchlorate reactants.

---

Hydroxylammonium perchlorate (HAP) is an oxidizer that has great utility in the field of solid rocket propellant compositions. Heretofore, its manufacture has been tedious, due to undesirable side products formed in the reaction of the starting materials necessary to produce hydroxylammonium perchlorate. For instance HAP may be produced by the reaction of hydroxylammonium sulfate with barium perchlorate. However, in addition to the hydroxylammonium perchlorate produced, it can be seen that barium sulfate will be produced. It is difficult and expensive to separate the barium sulfate precipitate from the desired HAP. An alternate synthesis of HAP involves the reaction of hydroxylammonium chloride with barium perchlorate in ethanol. This synthesis is undesirable because a nonaqueous flammable solvent must be used, and once again a filtration step is required to remove precipitated barium chloride. Still another synthesis involves the reaction of hydroxylammonium chloride with concentrated perchloric acid. This synthesis is undesirable because of the high concentration of perchloric acid required and the difficulty of removing resulting hydrochloric acid from the desired HAP.

It is an object of this invention to provide a method for producing hydroxylammonium perchlorate.

It is a further object of this invention to provide a method for producing hydroxylammonium perchlorate that does not produce side products that are difficult to separate from the desired hydroxylammonium perchlorate.

Other objects and many attendant advantages will be evident from the following description.

The objects of this invention are accomplished by separating the anion and cation portions of the hydroxylammonium or perchlorate starting material. The hydroxylammonium cation is then reacted with the perchlorate anion, out of the presence of the interfering anions or cations. The ion separation is achieved by means of ion exchange resins. The ion exchange resins can be either cationic or anionic. That is, the hydroxylammonium ion may be deposited on a cationic resin and the starting hydroxylammonium compound anion removed, or the anion may be deposited on the resin and the hydroxylammonium cation removed. The hydroxylammonium cation, when separated from its anion, can then be reacted with a perchlorate anion so as to produce hydroxylammonium perchlorate. Alternatively, the starting perchlorate ion may be separated from its interfering cation, and then reacted with the hydroxylammonium.

As mentioned before, either anion or cation selective exchange resins may be used. Examples of suitable anion selective resins are ammonium-substituted polystyrenes, amine-substituted polystyrenes, or phenol-formaldehyde resins. An example of a suitable cation selective resin is sulfonated polystyrenes.

If an anion exchange resin such as ammonium substituted polystyrene is used, the passing of a solution of a hydroxylammonium salt over the resin will result in an effluent containing hydroxylamine and few, if any, anions. The effluent may then be reacted with aqueous perchloric acid, producing HAP. The HAP solution may then be concentrated and HAP removed by means known in the art.

Alternately, an anionic exchange resin in the chloride form may be used by passing a perchlorate salt solution over it until the effluent is free of chloride. An aqueous solution of hydroxylammonium chloride may then be passed through the resin until the effluent again contains traces of chloride. The resulting aqueous solution of hydroxylammonium perchlorate than may be concentrated by means known in the art.

If an anion exchange resin in carbonate form is used, the passing of a solution of hydroxylammonium salt over the resin will result in an effluent containing hydroxylammonium carbonate. This effluent may be titrated with aqueous perchloric acid until carbon dioxide has been released. The reaction will have gone to completion when the pH is reduced to about 4. Hydroxylammonium perchlorate may be recovered from the solution by means known in the art.

If a cation exchange resin, such as sulfonated polystyrene, is used, the passing of a solution of a hydroxylammonium salt over the resin will result in the deposition of hydroxylammonium cations on the resin. The effluent will contain the undesirable anions, for instance sulfate or chloride ions. A solution of perchloric acid may then be passed over the burdened cation exchange resin, producing an effluent containing HAP, and regenerating the resin. The pH of the effluent should be adjusted to about 4. The HAP may then be concentrated and separated by means known in the art.

It can be seen that HAP could also be made by passing a perchlorate salt over a cationic exchange resin, thereby producing effluent fluid containing perchloric acid. Upon reaction of this perchloric acid with hydroxylamine, HAP would be produced. However, this synthesis, also within the scope of the invention, would seem to be of academic interest only. It is clear that the perchloric acid could be purchased directly cheaper than generating it by using an ion exchange resin.

The following examples are illustrative of the preferred mode for carrying out the process of the invention.

EXAMPLE I 1000 g. of Dowex 1, quaternary ammonium substituted polybenzyl anion exchange resin manufactured by The Dow Chemical Co., containing 1.4 equivalents of exchangeable chloride ion, is placed in a 1 inch diameter column and a solution of 160 g. (1.36 mole) of ammonium perchlorate dissolved in 2000 cc./$H_2O$ is passed through the resin bed over a period of thirty minutes, followed by a five minute wash with 1000 cc. of distilled water. The effluent, a solution of ammonium chloride, is discarded. Then, a solution of 94 g., (1.35 moles) of hydroxylammonium chloride in 100 cc./$H_2O$ is passed through the resin. The effluent, a solution of hydroxylammonium perchlorate, is concentrated at 60° C. under vacuum to a volume of 300 ml., and then cooled with stirring to —10° C. to crystallize the HAP. The slurry is filtered cold, washed with 10 ml. of ice water, and dried in a vacuum oven to yield pure hydroxylammonium perchlorate.

EXAMPLE II 200 g. of Dowex 2, quaternary ammonium substituted polybenzyl anion exchange resin produced by The Dow Chemical Co., is converted to the carbonate form by passing a solution of sodium carbonate through a bed of the resin in the as received chloride form. A glass column one-half inch in diameter and 25 inches long is filled with the wet Dowex 2 and a solution of 80 g. of sodium carbonate in 1000 cc. of distilled water is passed through the column in 30 minutes. The column is rinsed with 2000 cc. of $H_2O$ in the next 30 minutes, and the effluent discarded. Then, a solution of 25 g. of hydroxylammonium chloride in 500 cc. of $H_2O$ is slowly percolated through the resin bed over a one hour period fololwed by a 500 cc. distilled water rinse at the same rate.

A solution of perchloric acid containing 36 g. of $HClO_4$ in 200 cc. of water is slowly added to this effluent at the rate required to maintain a slow controllable evolution of $CO_2$. After addition is complete, the solution is boiled for five minutes to completely remove the $CO_2$, and evaporated to dryness under vacuum. The product, 48 g. of relatively pure hydroxylammonium perchlorate, can be further purified by recrystallization if desried.

EXAMPLE III

Two hundred grams of wet Dowex 50 in the acid form, a sulfonated polystyrene cation exchange resin manufactured by The Dow Chemical Co., is charged to the glass column described in Example II and a solution of 54 g. of hydroxylammonium chloride in 1000 cc. of water passed over the resin in one hour, followed by 2000 cc. of distilled water at the same rate. The effluent, a dilute solution of hydrochloric acid, is discarded. A five percent solution of perchloric acid is then pased over the resin at the same rate. The pH of the effluent is monitored continuously and the product fraction collected between pH 1.5 and 3.5. When the pH drops below 1.5, addition of perchloric acid is stopped and the column rinsed with 2000 cc. of distilled water to be ready for a second batch, if desired. The product fraction is evaporated to drynes and relatively pure solid hydroxylammonium perchlorate is recovered.

EXAMPLE IV 200 grams of wet Dowex 21K, a strongly basic trimethyl benzylammonium polystyrene exchange resin manufactured by The Dow Chemical Co., is charged to the glass column described in Example II and a solution of 530 cc. of 10 percent sodium hydroxide solution is pased over the resin in one hour, followed by 2000 cc. of distilled water at the same rate. The effluent, a dilute solution of sodium chloride, is discarded. A solution of 25 grams of hydroxylammonium sulfate in 250 cc. of water is then passed over the resin. Distilled water is passed through the resin until the pH of the effluent decreases to 8.5. The water effluent is neutralized to a pH of 3.0 with a 10 percent solution of perchloric acid, producing a solution of hydroxylammonium perchlorate. The product fraction is evaporated to dryness and relatively pure solid hydroxylammonium perchlorate is recovered.

Other reaction schemes and resins will be obivous to those skilled in the art. It can be seen that the basic idea embodied in the present invention is the removal, by means of ion exchange resin, of interfering, undesirable ions from the hydroxylammonium or perchlorate reactants. It will be understood that it is intended to cover all changes and modifications of the examples of the invention herein chosen for the purpose of illustration which do not constitute departures from the spirit and scope of the invention.

We claim:
1. The method of producing hydroxyammonium perchlorate comprising:
   contacting a mole of a member selected from the group of compounds consisting of ammonium perchlorate, and perchloric acid with a hydroxylammonium salt and with an ion exchange resin,
   wherein the ion exchange resin is a compound selected from the group consisting of ammonium-substituted polystyrenes, quaternary ammonium substituted polybenzyl, amine-substituted polystyrenes, phenol-formaldehyde resins, and sulfonated polystyrenes;
   separating the cations of that compound from the anions thereof by washing said contacted resin with a washing medium having an acidic pH;
   reacting by intimately contacting said separated anions and cations capable of forming hydroxylammonium perchlorate; and wherein said separated anions are independently reacted with a mole of a hydroxylammonium salt to form hydroxylammonium perchlorate when so reacted with the separated ions;
   and wherein said separated cations are independently reacted with a mole of perchloric acid to form hydroxylammonium perchlorate when so reacted with the separated ions;
   forming thereby hydroxylammonium perchlorate; and
   separating the hydroxylammonium perchlorate formed by evaporating the solvent therefrom to give crystalline hydroxylammonium perchlorate.

References Cited

UNITED STATES PATENTS

| 3,420,621 | 1/1969 | Watters et al. | 23—356 XR |
| 2,768,874 | 10/1956 | Robson | 23—85 |

OTHER REFERENCES

O. Samuelson, book Ion Exchange Separations in Analytical Chemistry, 1963, Ed., p. 181. John Wiley & Sons, New York.

O. Samuelson, book Ion Exchangers in Analytical Chemistry, 1963, Ed., p. 121. John Wiley & Sons, New York.

EDWARD STERN, Primary Examiner

U.S. Cl. X.R.

23—190, 356